United States Patent [19]

Kemmer

[11] 4,319,895

[45] Mar. 16, 1982

[54] OPTIMIZING THE QUALITY OF STEAM FROM GEOTHERMAL FLUIDS

[75] Inventor: Frank N. Kemmer, La Grange, Ill.

[73] Assignee: Nalco Chemical Company, Oak Brook, Ill.

[21] Appl. No.: 150,921

[22] Filed: May 19, 1980

Related U.S. Application Data

[63] Continuation-in-part of Ser. No. 10,196, Feb. 8, 1979, abandoned.

[51] Int. Cl.³ .............................................. B01D 14/00
[52] U.S. Cl. ........................................ 55/73; 60/641.5
[58] Field of Search .............................. 203/11, 7, 35; 159/27 R, DIG. 13, DIG. 14; 60/641 F; 55/36, 39, 68, 73

[56] References Cited

U.S. PATENT DOCUMENTS

| | | | |
|---|---|---|---|
| 3,420,775 | 1/1969 | Cadwalloder | 203/7 X |
| 3,501,384 | 3/1970 | Stermer | 203/35 X |
| 3,782,468 | 1/1974 | Kuwada | 60/641 F X |
| 4,062,764 | 12/1977 | White et al. | 203/7 X |
| 4,123,506 | 10/1978 | Spevack | 55/73 X |
| 4,247,371 | 1/1981 | Roller | 203/7 |

OTHER PUBLICATIONS

*Hydrogen Sulfide Abatement at Geothermal Wells,* Harry Gastrantas et al., presented at Geothermal Env. Seminar, Lake County, Calif. Pollution Control Board, Oct. 28, 1976, pp. 1, 8, 9.

*How Steam is Produced and Handled at the Geysers,* Robert Snyder, World Oil, Jun. 1975, pp. 43–48.

*Primary Examiner*—Frank A. Spear, Jr.
*Attorney, Agent, or Firm*—John G. Premo; Robert A. Miller; John S. Roberts, Jr.

[57] ABSTRACT

This invention relates to a method of optimizing the usable content of geothermal fluids to make use of steam in the largely aqueous and heated fluid. These fluids contain non-condensable gases, such as $H_2S$ and $CO_2$, as well as small quantities of acid and $B(OH)_3$. The removal of the more troublesome and corrosive agents, $H_2S$ and $CO_2$, is expressed here by utilization of pH control in an evaporator or series of evaporators. At an acid or low pH (3 to 5) in the input side of an evaporator, the non-condensable gases are non-ionized and exert partial gas pressures, and in the input chamber they may be removed or separated from the condensable gases. In the condensate side of the evaporator where the pH is maintained in the alkaline range and preferably about 11, the $H_2S$ and $CO_2$ are ionized in solution as acids and acid salts and do not separate out as gases.

3 Claims, 2 Drawing Figures

OPTIMIZING THE QUALITY OF STEAM FROM GEOTHERMAL FLUIDS

This is a continuation-in-part application of Ser. No. 010,196 filed Feb. 8, 1979, entitled "Optimizing the Quality of Steam from Geothermal Fluids," now abandoned.

This invention relates to a method of optimizing the usable content of geothermal fluids to make use of steam in the largely aqueous and heated fluid. These fluids contain non-condensable gases, such as $H_2S$ and $CO_2$, as well as small quantities of acid and $B(OH)_3$. The removal of the more troublesome and corrosive agents, $H_2S$ and $CO_2$, is expressed here by utilization of pH control in an evaporator or series of evaporators. At an acid or low pH (3 to 5) in the input side of an evaporator, the non-condensable gases are non-ionized and exert partial gas pressures, and in the input chamber they may be removed or separated from the condensable gases. In the condensate side of the evaporator where the pH is maintained in the alkaline range and preferably about 11, the $H_2S$ and $CO_2$ are ionized in solution as acids and acid salts and do not separate out as gases.

PRIOR ART STATEMENT

U.S. Pat. No. 3,420,775—Injection of $CO_2$ gas under pressure changes the equilibrium of the bicarbonate to carbonate plus $CO_2$ in the equation.

Betz Handbook of Industrial Water Conditioning, 6th Edition, 1962, pages 57, 338, 349–352.

Bregman, *Corrosion Inhibitors*, McMillan, 1st Edition, 1963, pages 35, 75, 79, 81.

Nathan, *Corrosion Inhibitors*, 1973, pages 42–46, 76–88, 96–97, 102–113.

In the consideration of the above prior art, it is apparent that applicant's process of sequential pH control to utilize a pH of 3-5 to vent or eliminate non-condensable gases such as $H_2S$ and $CO_2$ from a geothermal fluid and then to utilize a high pH of about 11 in the condensate side of an evaporator to maintain the $H_2S$ and $CO_2$ in solution as ionized acids or salts is different from the prior art.

In the control of pH historically, so far as cooling towers and boilers are concerned, the pH limitation has been between about a low range of 5 and an upper range of 8 and the upper range of pH 8 is made as high as possible without having scaling problems.

Geothermal fluids are defined as fluids proceeding from an underground source generally of volcanic origin. Geothermal wells are found in various parts of the United States, most noticably in California, Switzerland and the Philippines, among other locations. The geothermal fluids utilized in this invention and which are useful commercially generally consist of high temperature, high pressure water and/or steam.

In connection with the present clean up of geothermal fluid and the utilization of evaporators, it has been found possible to use pH values outside of these limits of 5-8 without substantial formation of scale and with the fulfillment of the purpose of the invention. In the prior art, see Bergman, supra, page 79, where iron was a problem in a cooling tower system and a pH of about 6 was denoted as the lower limit due to substantial corrosion in the acid range below that pH. Again, in meeting the twin perils of scale at higher or more alkaline pH and corrosion at acid or lower pH, the present invention has drawn somewhat different pH limitations. Furthermore, as an assistant as corrosion and deposition inhibitors, the present invention utilizes a film-forming amine, such as morpholine, cyclohexylamine and the disclosure in U.S. Pat. No. 4,062,764 White et al, which is an alkoxyalkylamine which serves to utilize acidic components. Sequential evaporators may be utilized and are preferred [Shell and Tube Heat Exchangers 11-3 (Perry et al, *Chemical Engineers' Handbook*, 5th edition, McGraw-Hill, 1973)].

DESCRIPTION OF THE DRAWINGS

Referring now to FIG. 1, geothermal fluid 11 is fed into a flash tank 12 and then steam 13 at about 300 psi is fed from the flash tank to the input tube side 14 of an evaporator which is acidified to about a pH of 4.0. Gases, largely non-condensable gas, $CO_2$, $H_2S$, $H_2$, $N_2$ and $B(OH)_3$, are vented at 15. Steam condensate from the evaporator is collected in flash tank 16 and said condensate is made alkaline by introduction of NaOH to a pH of 11 from dispenser 17. The process gas from the condensate side of the evaporator comes off the top at about 240 psi and is treated with an amine corrosion inhibitor; e.g., Nalso 354. In the above process set up, the philosophy of treatment is (1) to keep the pH low in the feed side of the evaporator (or gas separator) to maximize the venting of $H_2S$, $CO_2$, $H_2$, and $N_2$ and (2) to keep the pH high in the condensate system to minimize the discharge of $H_2S$ and $CO_2$.

$H_2S$

The hydrogen sulfide may be present in a water supply either to chemical or biological causes or both. It possesses an odor which becomes objectionable in the concentration of 1 ppm or more. The hydrogen sulfide concentration can vary from trace quantities to about 600 mg/liter in extremely sour areas. The dissociation constants of $H_2S$ are (1) $9.1 \times 10^{-5}$ and (2) $1.1 \times 10^{-12}$ at 25° C.

$CO_2$

Free $CO_2$ is a term used to designate $CO_2$ and to differentiate a solution of carbon dioxide gas from combined carbon dioxide present in the form of bicarbonate and carbonate ions. The dissociation constants of $H_2CO_3$ are (1) $4.3 \times 10^{-7}$ and (2) $5.61 \times 10^{-11}$ at 25° C.

As an alternate process to remove $H_2S$ from the system it is also possible by other methods to remove the sulfide from the condensate first produced from the geothermal steam before this condensate is fed to the steam generation side of the evaporator. The sulfide may be precipitated and filtered through the water by use of heavy metals or chlorinated to free sulfur and filtered out as a colloidal material using a coagulant and flocculant on a diatomite-type filter.

EXAMPLE 1

Figure 1:
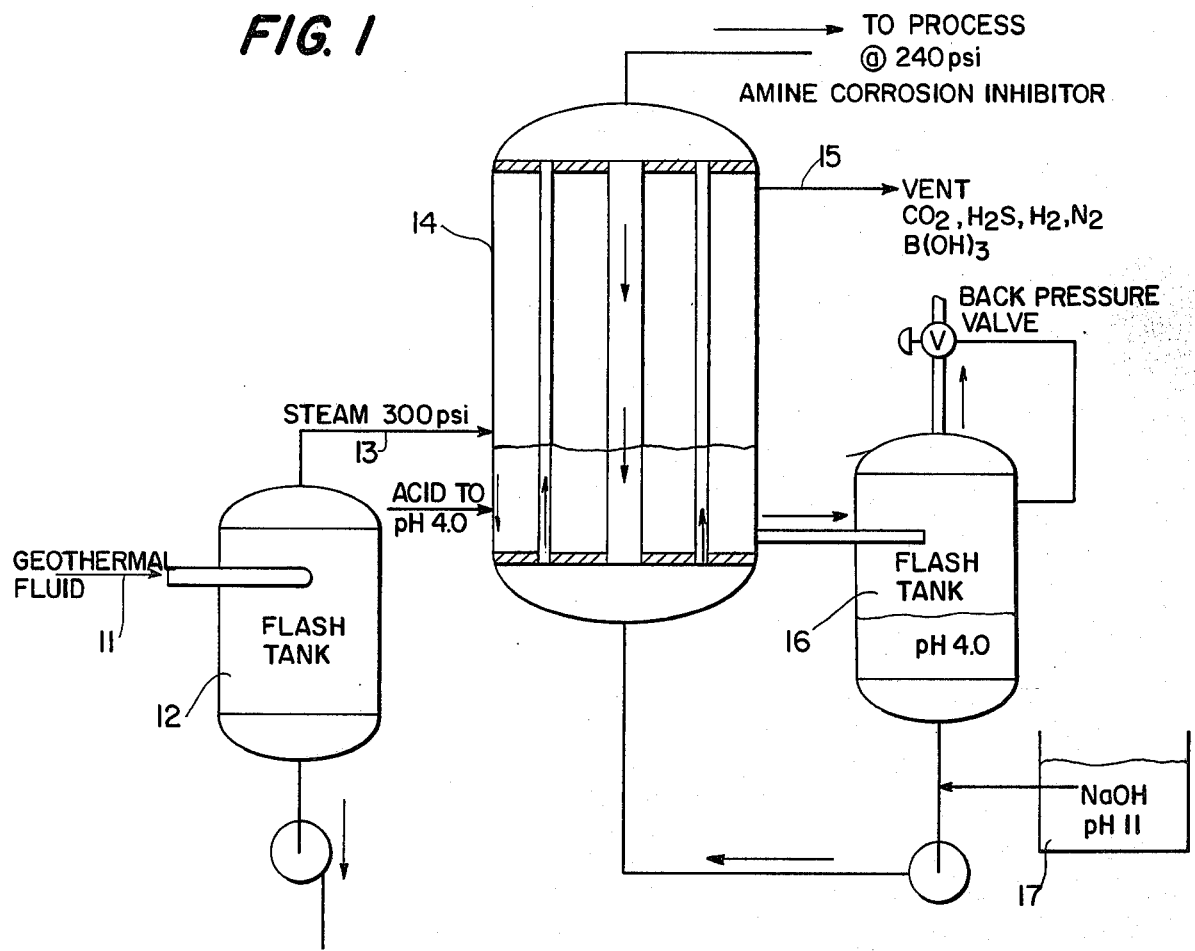
FIG. 1 is a schematic illustrating the invention and shows a typical process arrangement in the utilization of pH.
Figure 2:
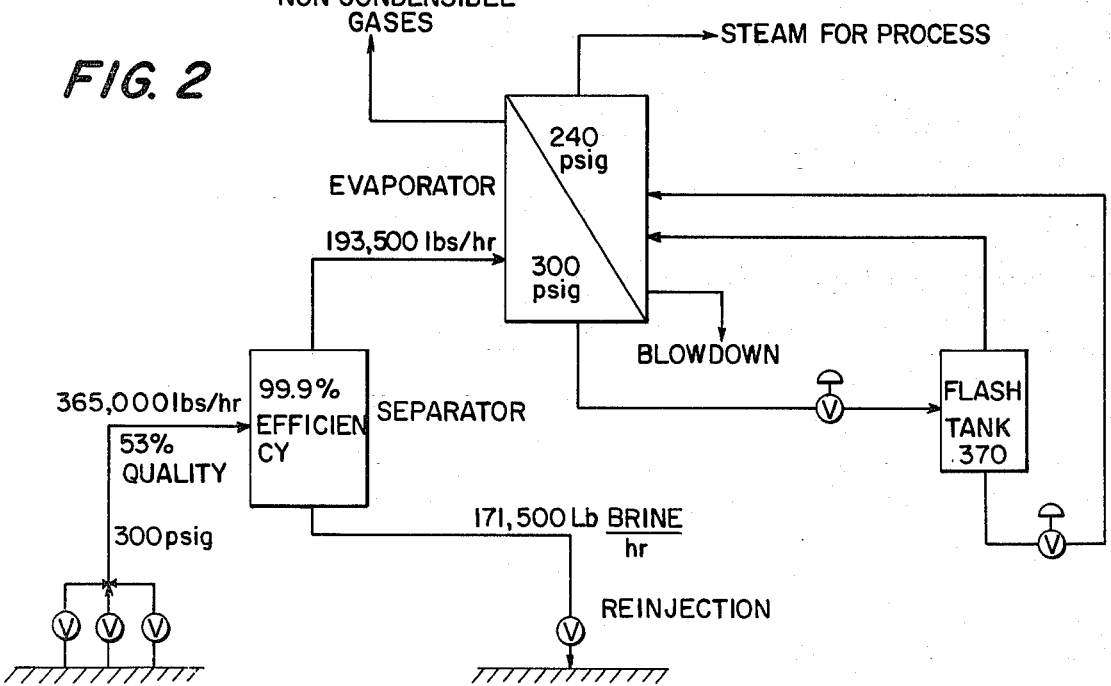
FIG. 2 is a schematic illustrating Example 1.

With reference to the schematic diagram in FIG. 2, there appears in the lower left hand corner the diagram showing three lines coming out of the ground. These represent three geothermal wells bringing up a combination of 53% vapor and 47% entrained liquid. The pressure at this point is 300 psig and the quantity (total)

is 365,000 lbs/hour. This combination of vapor and entrained liquid enters a separator which has about a 99.9% efficiency. The entrained liquid which is separated off is then reinjected back into the ground and the vapor (193,500 lbs/hour) is to be injected on the shell side of an evaporator very similar to a juice evaporator in a sugar factory. The condensate which is made in this process is then basically reinjected onto the tube side of this evaporator and the steam is then sent to the factory.

The gas shows a total gas content of 2100 ppm for non-condensable gases. This may be broken down in the following manner for these different gases:

$CO_2$—1266 ppm
$H_2S$—456 ppm
$N_2$—363 ppm
$H_2$—13 ppm

These non-condensable gases were treated in an evaporator as noted above where the pH was controlled at 3–5 and the $H_2S$ and $CO_2$ were separated at the vapor and entrained liquid point. The condensate noted above was held at a pH of 13.

I claim:

1. A method of treating geothermal fluid which comprises optimizing the quality of product steam discharged after steam-water separation by an evaporator wherein the quality of steam is optimized by pH control to reduce the content of associated non-condensable gases selected from a group consisting of $H_2S$ and $CO_2$ and where the pH in the input side of the evaporator is kept in the acid range and the pH in the condensate side of the evaporator is maintained in an alkaline range.

2. The method according to claim 1 wherein the pH in the input side of the evaporator is kept in the range of 3–5 in order to promote venting of $H_2S$ and $CO_2$ and the pH in the condensate side of the evaporator is maintained at about 11.

3. The method according to claim 2 wherein the condensate is used as input to the steam generating side of a second evaporator.

* * * * *